United States Patent
Paran et al.

(10) Patent No.: US 11,775,865 B1
(45) Date of Patent: Oct. 3, 2023

(54) MACHINE LEARNING SYSTEM, METHOD, AND COMPUTER PROGRAM FOR EVALUATION OF CUSTOMER SERVICE AGENTS

(71) Applicant: Amdocs Development Limited, Limassol (CY)

(72) Inventors: Eran Yosef Paran, Hod Hasharon (IL); Shmuel Ur, Shorashim (IL); Liat Taub Bahar, Kfar Sabba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 348 days.

(21) Appl. No.: 16/985,073

(22) Filed: Aug. 4, 2020

(51) Int. Cl.
| | |
|---|---|
| *G06Q 30/00* | (2023.01) |
| *G06N 20/00* | (2019.01) |
| *G06Q 30/0201* | (2023.01) |
| *G06Q 30/0601* | (2023.01) |
| *G06V 40/16* | (2022.01) |
| *G06F 18/214* | (2023.01) |

(52) U.S. Cl.
CPC ........... *G06N 20/00* (2019.01); *G06F 18/214* (2023.01); *G06Q 30/0201* (2013.01); *G06Q 30/0601* (2013.01); *G06V 40/16* (2022.01)

(58) Field of Classification Search
CPC .. G06N 20/00; G06K 9/6256; G06Q 30/0201; G06Q 30/0601; G06V 40/16; G06F 18/214
See application file for complete search history.

(56) References Cited

U.S. PATENT DOCUMENTS

| | | | |
|---|---|---|---|
| 10,453,032 B1 | 10/2019 | Obeng et al. | |
| 11,200,742 B1 | 12/2021 | Post et al. | |
| 2007/0255619 A1* | 11/2007 | Ekchian | G06Q 30/0239 705/26.1 |
| 2009/0150296 A1* | 6/2009 | Kirovski | G06Q 30/06 705/80 |
| 2010/0142698 A1* | 6/2010 | Spottiswoode | H04M 3/5232 379/265.11 |
| 2011/0004481 A1* | 1/2011 | Jones | G06F 3/0488 705/1.1 |

(Continued)

OTHER PUBLICATIONS

P. -O. Siebers, U. Aickelin, H. Celia and C. W. Clegg, "Using intelligent agents to understand management practices and retail productivity," 2007 Winter Simulation Conference, 2007, pp. 2212-2220, doi: 10.1109/WSC.2007.4419856. (Year: 2007).*

(Continued)

*Primary Examiner* — Sun M Li
(74) *Attorney, Agent, or Firm* — Zilka-Kotab, P.C.

(57) ABSTRACT

As described herein, a machine learning system, method, and computer program are provided for evaluation of customer service agents. In use, presence of a customer at retail store is identified. Additionally, information associated with the customer is processed, using a machine learning model, to determine an expected outcome of an interaction with the customer occurring within the retail store. Further, after the interaction by an agent of the retail store with the customer, an actual outcome of the interaction is determined. Still yet, the agent is evaluated by comparing the actual outcome with the expected outcome. A result of the evaluation is then output, such as for use in assigning the agent to future in-store customers.

9 Claims, 6 Drawing Sheets

(56) References Cited

U.S. PATENT DOCUMENTS

| | | | |
|---|---|---|---|
| 2014/0143026 | A1 | 5/2014 | Nies et al. |
| 2014/0249873 | A1* | 9/2014 | Stephan ........... G06Q 10/06375 |
| | | | 705/7.11 |
| 2014/0297363 | A1 | 10/2014 | Vemana |
| 2015/0348163 | A1* | 12/2015 | Tamblyn ............. H04M 3/5175 |
| | | | 705/26.7 |
| 2016/0171577 | A1 | 6/2016 | Robinson, Jr. et al. |
| 2016/0196561 | A1 | 7/2016 | Iyer et al. |
| 2016/0248706 | A1* | 8/2016 | Karidi ................... H04L 67/535 |
| 2017/0039605 | A1 | 2/2017 | Khattar et al. |
| 2017/0111505 | A1* | 4/2017 | McGann ............. H04M 3/5191 |
| 2017/0193506 | A1* | 7/2017 | Karnati .............. G06Q 30/0251 |
| 2017/0337602 | A1 | 11/2017 | Davis |
| 2020/0258141 | A1* | 8/2020 | Habraken .............. G06N 20/00 |
| 2020/0364723 | A1 | 11/2020 | Gulevich et al. |

OTHER PUBLICATIONS

S. Lam, C. Chen, K. Kim, G. Wilson, J. H. Crews and M. S. Gerber, "Optimizing Customer-Agent Interactions with Natural Language Processing and Machine Learning," 2019 Systems and Information Engineering Design Symposium (SIEDS), 2019, pp. 1-6, doi: 10.1109/SIEDS.2019.8735616. (Year: 2019).*

ArXiv:2004.13463v1 [econ.GN] Apr. 28, 2020 How do online consumers review negatively? Menghan Suna, Jichang Zhaoa,b,* aSchool of Economics and Management, Beihang University, Beijing, China (Year: 2020).*

C. Aguilar-Palacios, S. Muñoz-Romero and J. L. Rojo-Álvarez, "Forecasting Promotional Sales Within the Neighbourhood," in IEEE Access, vol. 7, pp. 74759-74775, 2019, doi: 10.1109/ACCESS. 2019.2920380. (Year: 2019).*

F. -R. Lin, R. -W. Po and C. V. C. Orellan, "Learning Service Experience from the Service Encounter of a Retailing Chain Storefront," 2010 43rd Hawaii International Conference on System Sciences, Honolulu, HI, USA, 2010, pp. 1-10, doi: 10.1109/HICSS. 2010.252. (Year: 2010).*

Y. Kubera, P. Mathieu and S. Picault, "An Interaction-Oriented Model of Customer Behavior for the Simulation of Supermarkets," 2010 IEEE/WIC/ACM International Conference on Web Intelligence and Intelligent Agent Technology, Toronto, ON, Canada, 2010, pp. 407-410, doi: 10.1109/WI-IAT.2010.84. (Year: 2010).*

An Agent-Based Simulation of In-Store Customer Experiences, by Peer-Olaf Siebers, Uwe Aickelin, Helen Celia, Christopher Clegg arXiv:0803.1621 [cs.NE] (or arXiv:0803.1621v1 [cs.NE] for this version), Submitted on Mar. 11, 2008] https://doi.org/10.48550/arXiv.0803.1621. Year: 2008).*

Non-Final Office Action from U.S. Appl. No. 16/985,105, dated Mar. 3, 2022.

Paran et al., U.S. Appl. No. 16/985,105, filed Aug. 4, 2020.

Final Office Action from U.S. Appl. No. 16/985,105, dated Sep. 6, 2022.

Non-Final Office Action from U.S. Appl. No. 16/985,105, dated Feb. 3, 2023.

Notice of Allowance from U.S. Appl. No. 16/985,105, dated Jun. 14, 2023.

* cited by examiner

MACHINE LEARNING SYSTEM, METHOD, AND COMPUTER PROGRAM FOR EVALUATION OF CUSTOMER SERVICE AGENTS

FIELD OF THE INVENTION

The present invention relates to techniques for evaluating customer service agents.

BACKGROUND

In a physical store, or in any other setting including virtual stores and call centers, customer service agents interact with customers (e.g. to help the customers make purchases). Business entities would like to know if their agents do well or not in this regard, current measures that exist fall very short of the goal. For example, communication service providers (CSPs), as well as other merchants, who operate physical stores, are looking to maximize sales and for that are using various mechanisms to measure performance of store agents and sales teams and then create motivation to sell more.

It may be desired to evaluate sales agents according to how much money the customers they attended spent. It is possible that some agents are better at choosing the high spending customers, and hence will get a high evaluation. If agents are assigned to customers randomly, it is only possible get the aggregated value of the sales efforts and not an objective evaluation to the specific agents' performance. Further, it may be desired to evaluate agents according to different types of goals, such as increased spending, increased loyalty, net promoter score, returning customers, etc.

Another common evaluation mechanism is reviews by peers and managers. However, this evaluation may be driven more by the popularity among staff versus how good the agent is with the customers. Evaluating an agent based on how likable he is does not translate to specifically how good he is for the metrics set by the business entity such as increased sales.

Realizing sales agents' value to a commercial business is useful for many aspects of the business. This information can be used for personnel allocation, retention plans, compensation plans, etc. Agents' value can be measured in different KPIs: attribution to direct revenues, attribution to Net Promoter Score (NPS), attribution to retention, etc.

Still yet, different sales agents may have different strengths and different style. It may be desired to assign agents to customers to increase utility for the business entity. Assume, for example, an agent who is very good and can get people to buy a lot, but it takes him 15 minutes per customer. His style, what works for him, is to start with general talk on sports, weather, and fishing and only after some time get to the actual sale. This style is valuable to the company only in cases where high dollar spending is possible. When a business entity assigns agents to customers, it wants to make sure the business benefits from it.

To this end, it is desirable to find methods to evaluate the agent performance and his attribution to sales increase, and to use it for evaluating the agents for the business entity, building compensation plans which will drive the agent motivation to sell more, and assigning agents to customers. There is thus a need for addressing these and/or other issues associated with the prior art.

SUMMARY

As described herein, a machine learning system, method, and computer program are provided for evaluation of customer service agents. In use, presence of a customer at retail store is identified. Additionally, information associated with the customer is processed, using a machine learning model, to determine an expected outcome of an interaction with the customer occurring within the retail store. Further, after the interaction by an agent of the retail store with the customer, an actual outcome of the interaction is determined. Still yet, the agent is evaluated by comparing the actual outcome with the expected outcome. A result of the evaluation is then output, such as for use in assigning the agent to future in-store customers.

DETAILED DESCRIPTION

Figure 1:
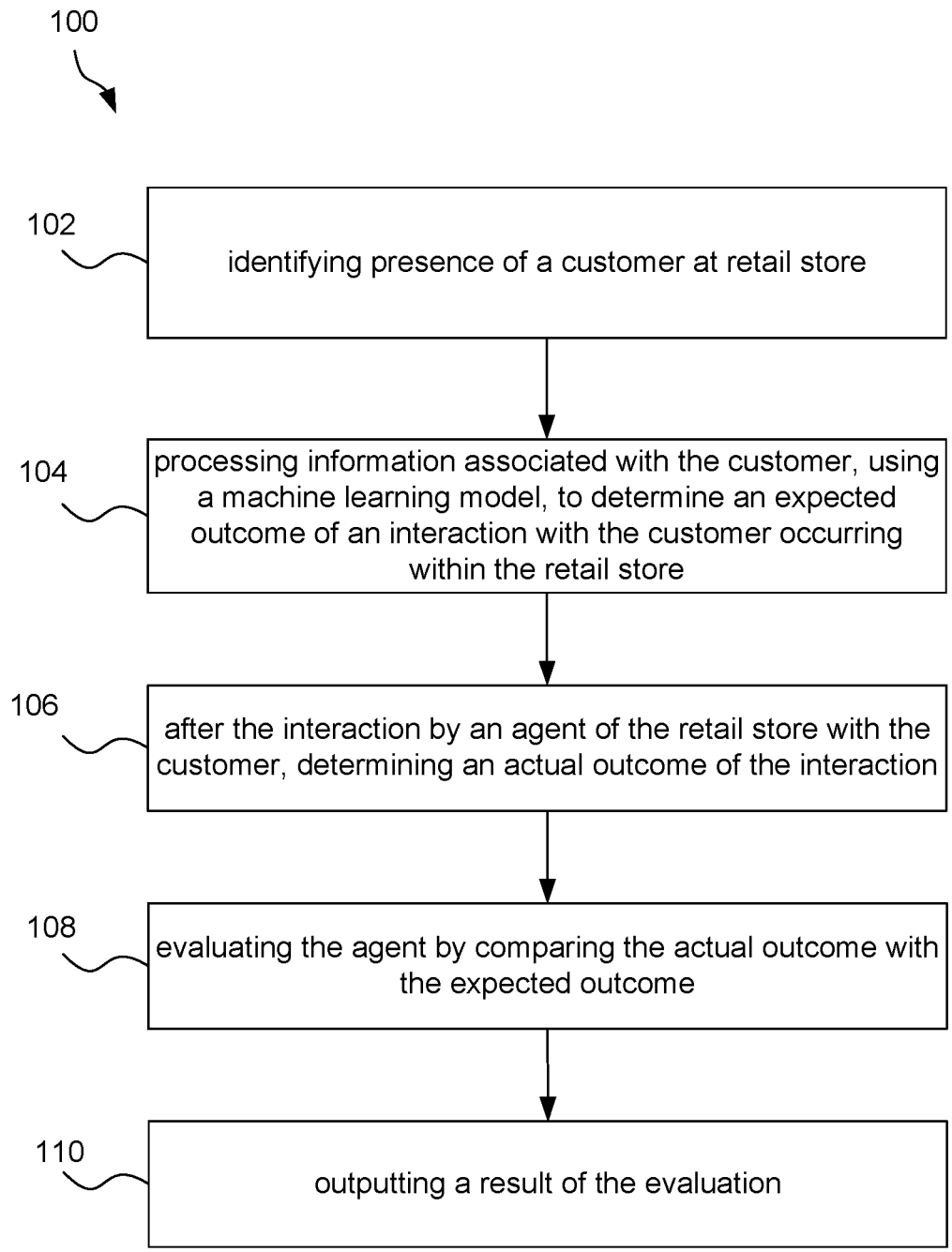
FIG. 1 illustrates a machine learning method for evaluation of customer service agents, in accordance with one embodiment.

FIG. 1 illustrates a machine learning method 100 for evaluation of customer service agents, in accordance with one embodiment. The method 100 may be performed by a computer system (e.g. server), such as that described below with reference to FIGS. 5 and/or 6. For example, the method 100 may be performed by the computer system of a provider of the retail store, such as a communication service provider (CSP), in one embodiment.

As shown in operation 102, presence of a customer at retail store is identified. The retail store may be a physical retail store, in one embodiment. In this case, the presence of the customer may be identified using a sensor located on premises of the retail store. In another embodiment, the retail store may be a virtual retail store (e.g. web store). In this case, the presence of the customer may be identified based on a connection (e.g. session) between a user device and the virtual retail store.

Optionally, the identification of the customer presence may include identification of the particular customer who is present in the retail store. For example, the particular customer may be identified using a facial recognition algorithm, particularly where the retail store is a physical retail store. As another example, the particular customer may be identified using a login of the customer to the virtual retail store or a cookie stored on a device of the customer that is accessed by the virtual retail store.

Additionally, in operation 104, information associated with the customer is processed, using a machine learning model, to determine an expected outcome of an interaction with the customer occurring within the retail store. The machine learning model may be trained to infer, for a particular customer, an outcome expected with respect to an interaction with the customer occurring within the retail store. The interaction may be specific to a particular customer service agent of the retail store or any agent of the retail store. The interaction may include an agent (i.e. human or computer program) communicating with the customer to provide retail assistance.

In one embodiment, the machine learning model may be trained using prior retail behavior recorded for the customer by a provider (e.g. CSP) of the retail store. For example, the data collected by the provider may include face and image recognition (e.g. recognizing the customer from previous visits, learning things from his appearance) and/or information from a store queue management system (e.g. customer identity and visit purpose based on queue system records). In another embodiment, the machine learning model may be trained using data in a customer relationship management (CRM) system (e.g. of the provider). The CRM data may include personal information, products and services purchased, previous interactions, bill analysis for detailed spending, etc. In yet another embodiment, the machine learning model may be trained using publicly available data. The public data may include personal details collected from social networks (e.g. birthday, marital status, domains of interest, etc.). In yet another embodiments, the machine learning model may be trained using demographics of customers (e.g. men versus women), type of equipment the customer has (e.g. if a person comes to buy shoes, may be the type and cost of shoes he is wearing is relevant), or any other data capable of being used to train the machine learning model to determine the expected outcome.

To this end, the information that is processed by the machine learning model to determine the expected outcome may include an identifier (e.g. unique identifier) of the customer, or any other information describing the customer that is capable of being used by the machine learning model to determine the expected outcome.

It should be noted that the expected outcome may be defined in any desired manner, for example, using one or more key performance indicators (KPIs). In one embodiment, the expected outcome of the interaction with the customer may include a monetary value. The monetary value may be a positive value for customer purchases (e.g. of products or services), a negative value for customer refunds (e.g. return of product or services), and zero for when no customer action is taken. The monetary value may indicate a particular amount (e.g. based on a particular product expected to be purchased, etc.).

In another embodiment, the expected outcome may relate to customer churn. For example, the expected outcome may indicate whether the customer is expected to churn (i.e. unsubscribe from a service of the provider). In still yet another embodiment, the expected outcome may relate to a customer lifetime value. For example, if the customer is provided with a particular device, it may be expected that the customer will purchase services related to that device in the future.

It should also be noted that the expected outcome may be determined at any point in time. For example, in one embodiment, the expected outcome may be determined prior to actual interaction between an agent and the customer. In another embodiment, however, the expected outcome may be determined after the actual interaction between an agent and the customer (e.g. after the customer makes a purchase or other transaction with the retail store), which may be the case where the customer is only identified from the interaction or a resulting transaction (e.g. purchase, refund, etc.).

Further, in operation 106, after the interaction by an agent of the retail store with the customer, an actual outcome of the interaction is determined. The actual outcome may be determined based on a log of the interaction (e.g. made by the agent), information (e.g. a purchase, etc.) input to a system in association with the visit of the customer to the retail store, or in any other manner. Similar to the expected outcome described above, the actual outcome may be defined using the same KPIs, such as monetary value and/or churn.

Still yet, in operation 108, the agent is evaluated by comparing the actual outcome with the expected outcome. For example, a difference in the actual and expected outcomes may be calculated or otherwise determined. Where the actual outcome is favorable to the expected outcome, the evaluation of the agent may be positive (or a particular positive score). Where the actual outcome is unfavorable to the expected outcome, the evaluation of the agent may be negative (or a particular negative score). A result of the evaluation (e.g. the positive or negative evaluation result) is then output, as shown in operation 110.

To this end, machine learning may be used as a basis for evaluating an agent's interaction with a customer in a retail store. As an option, the agent may be evaluated over time for multiple customer interactions, using the method 100, and results of the evaluations may be combined to provide an overall evaluation of the agent. The Evaluation results may be output and used for many purposes, such as delivering a monetary or other bonus to the agent, reporting, or assigning the agent to future customers as described in more detail below with reference to FIG. 4.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
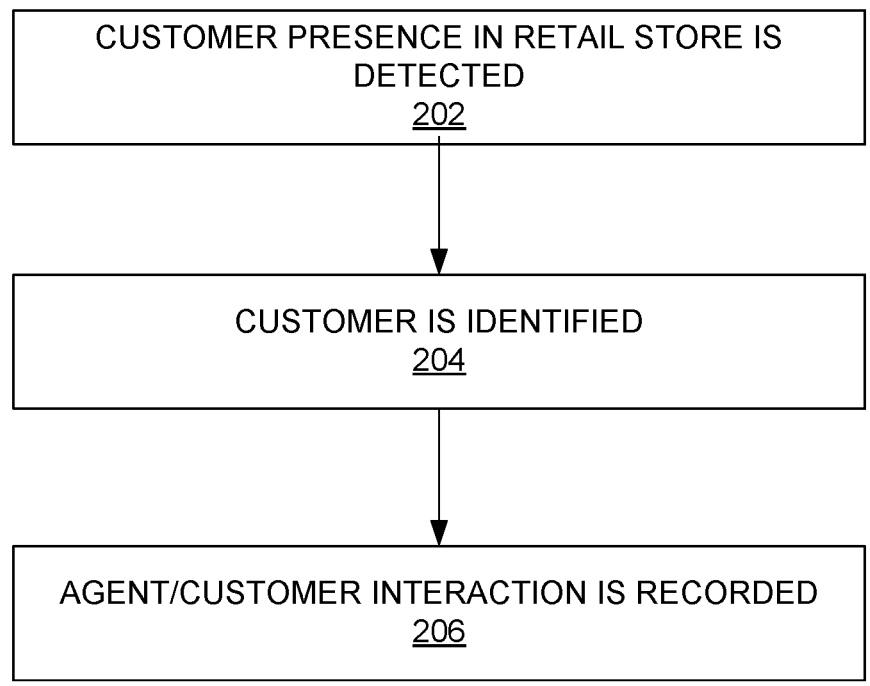
FIG. 2 illustrates a block diagram of a method for recording an interaction between an agent and a customer, in accordance with one embodiment.

FIG. 2 illustrates a block diagram of a method 200 for recording an interaction between an agent and a customer, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

As shown in block 202, customer presence in a retail store is detected. Additionally, in block 204, the customer is identified. Customer identification can be done upon entry to the store, for example using face recognition, in one embodiment. In another embodiment, the customer identification may be made during an interaction with an agent or after the interaction (e.g. based on a credit card used by the customer to make a purchase).

Further, in block 206, an interaction between the agent and the customer is recorded. The interaction may be made over any channel, such as in person, CRM in voice, text, social app, etc. The interaction may be recorded in real-time, based on a log input by the agent, based on a purchase made by the customer and/or refund given to the customer via a point of sale system of the retail store, or in any other desired manner. In this way, an actual outcome of an interaction between the agent and the customer may be determined from the recorded interaction.

Figure 3:
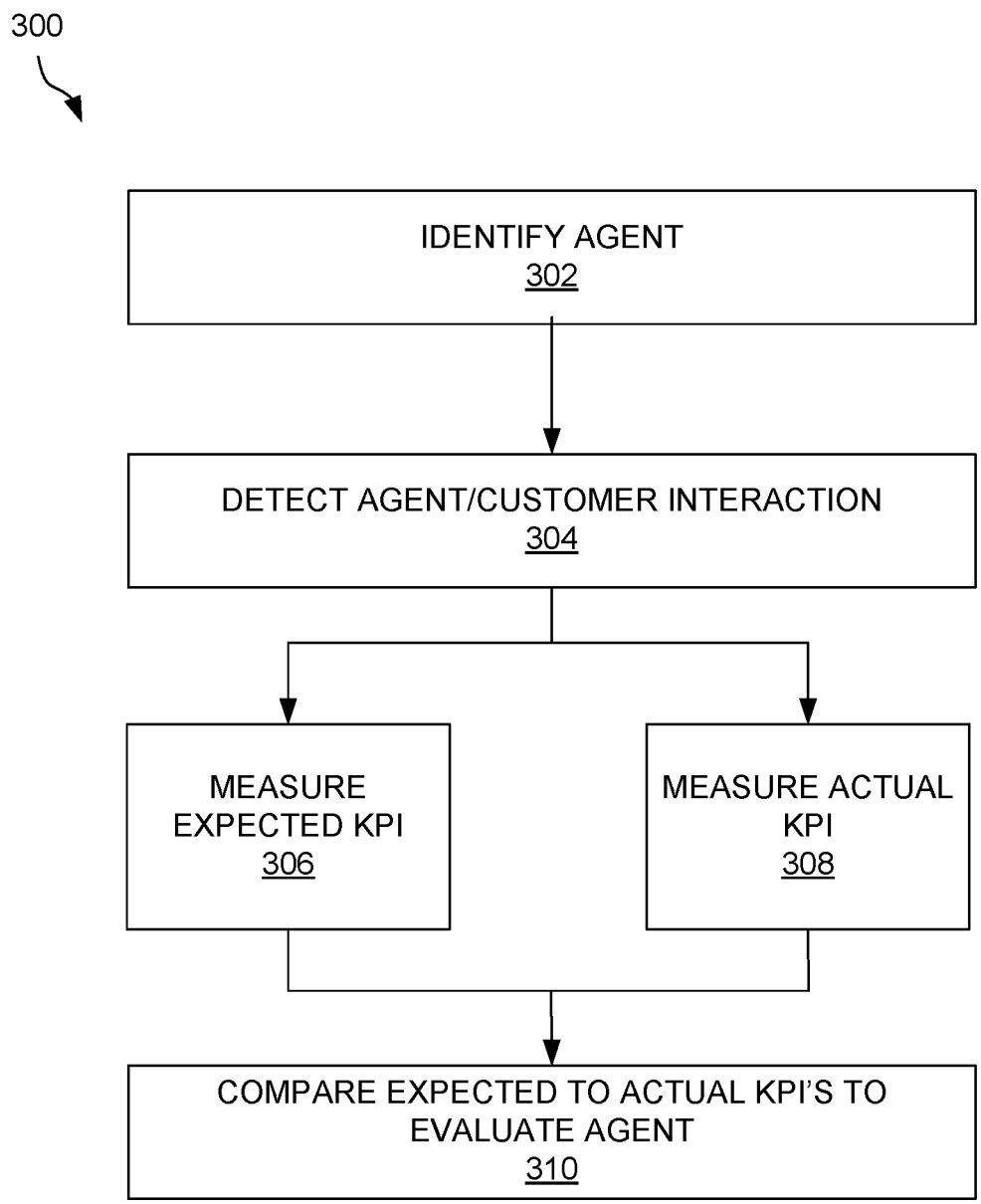
FIG. 3 illustrates a block diagram of a method for evaluating an agent based on expected and actual customer interactions, in accordance with one embodiment.

FIG. 3 illustrates a block diagram of a method 300 for evaluating an agent based on expected and actual customer interactions, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

As shown in block 302, an agent is identified. Then, in block 304, an agent/customer interaction is detected. Further, an expected KPI (or KPIs) is measured for the interaction in block 306, and an actual KPI (or KPIs) is measured for the interaction in block 308. Moreover, the expected and actual KPIs are compared to evaluate the agent, as shown in block 310. Blocks 304-310 may be repeated for each interaction between the agent and a customer, to provide an aggregate evaluation of the agent. Additionally, the method 300 may be repeated for each agent of the retail store.

Figure 4:
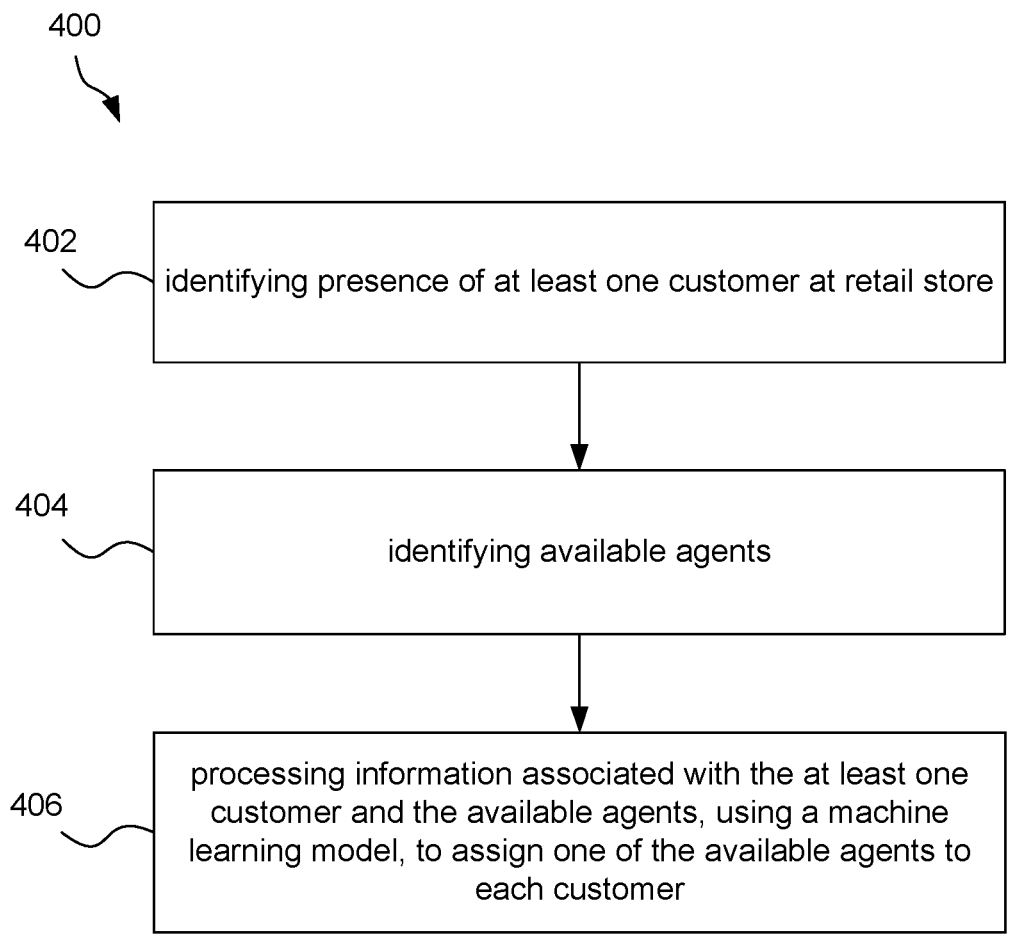
FIG. 4 illustrates a machine learning method for assigning an agent to a customer, in accordance with one embodiment.

FIG. 4 illustrates a machine learning method 400 for assigning an agent to a customer, in accordance with one embodiment. As an option, the method 400 may be carried out in the context of the details of the previous figure and/or any subsequent figure(s). For example, the method 400 may be carried using the agent evaluation output in the method 100 of FIG. 1. Of course, however, the method 400 may be carried out in the context of any desired environment. Further, the aforementioned definitions may equally apply to the description below.

As shown in operation 402, presence of at least one customer in a retail store is identified. Thus, a single customer's presence or a plurality of customers concurrent presence may be identified. Further, in operation 404, available agents are identified. The available agents may be agents that are available to interact with the customer(s). In operation 406, information associated with the customer(s) is processed, using a machine learning model, to assign one of the available agents to each customer. In particular, the agent may be assigned to interact with the customer.

The machine learning model may be trained to predict expected outcomes of interactions between specific agents and specific customers. The training may be performed using various information associated with customers, agents, and results of agent evaluations. The customer information may include demographics (e.g. age, language, nationality, gender, race, income, address, etc.), expectations (e.g. what he plans to buy, how much money he plans to spend, etc.), and/or context (e.g. present in the retail store by himself, time of day, weekday versus weekend, dresses well, etc.). The agent information may include personal details and demographics (e.g. language, nationality, tenure in the company of the provider, training courses, manager evaluation, etc.), outcomes of prior customer interactions, etc. The results of agent evaluations may be those described above with reference to FIGS. 1 and/or 3.

The input to the additional machine learning model may include an identification of the customer(s) as well as any of the customer information described above, and an identification of circumstances associated with an interaction to be had with the additional customer (e.g. circumstances of the customer's presence in the retail store). The input to the additional machine learning model may also include an indication of the available agents and any of the agent information described above.

The machine learning model may then process the input to provide output that is used to select which agent is assigned to which customer. The output may indicate an expected monetary value for each combination of agent/customer, such as an expected monetary value to be realized through interaction between the customer and each available agent. The output may indicate an expected time required to serve the customer for each combination of agent/customer. Based on this output, an algorithm may be used to select which agent is assigned to which customer, which optimizes the expected monetary value in view of the expected time required to serve for any combination of customers concurrently present in the retail store.

It should be noted that there are many criteria that may be used (e.g. by the machine learning model) to determine which agent is a best fit for the customer, or at least that may be used for selecting which agent to use for the customer. One of the criteria may be language, such that an agent that is able to speak the language used by the customer (e.g. as used within the customer group) may be selected. Another one of the criteria may be nationality, such that an agent with a same nationality as the customer may be selected.

Agent Assignment for a Single Customer Present in a Retail Store

Given any customer, the method 400 can select which agent is assigned to interact with that customer. This uses the machine learning model described above, which takes as input the customer and outputs the following table of expectation shown in Table 1.

TABLE 1

| Agent | Utility | Time to serve |
| --- | --- | --- |
| No Agent | 52 | 0 |
| George | 50 | 10 |
| Linda | 78 | 15 |

The algorithm may select an agent for the customer solely based on utility (i.e. monetary value). For example, given such Table 1, the algorithm may assign Linda to the customer or not (if she has something better to do), but for this customer there is no value in assigning George to the customer since the rate for No Agent is higher than the rate for George. Of course, other algorithms may also be used that also take into consideration the time to required serve for each agent.

Agent assignment for a multiple customers concurrently present in a retail store When there are multiple concurrent customers present in the retail store, the method 400 may assign an agent to each customer. This uses the machine learning model described above, which takes as input the customers and outputs the following table of expectation shown in Table 2.

TABLE 2

| Customer | No agent utility | George utility/time | Linda utility/time |
| --- | --- | --- | --- |
| 1 | 10 | 15/10 | 20/10 |
| 2 | 3 | 10/10 | 10/10 |
| 3 | 72 | 100/10 | 200/20 |
| 4 | −15 | 0/10 | −15/5 |

The algorithm that assigns agents to customers may take into consideration a desired total time to serve all customers, as well as utility value. In this case, for 20 minutes to serve all customers, Linda will best serve customer 3, while George will use his time best with customers 4 and 2. The algorithm optimizes the use of agents for customer interactions based on the matrix.

Once an agent is assigned to a customer, the agent may be notified of the assignment to begin interacting with the customer.

Option for Assigning Computer Program-Based Agents to Customers

In one embodiment, the agents may be computer programs, such as an actual robot moving in the retail store, a soft bot the customer goes to a kiosk to talk to, a software agent on the customer's device, etc. Optionally, multiple computer programs from multiple vendors may be also be used, each having different evaluations for different customer interactions. The method 400 may therefore equally apply to assigning computer program-based agents, whether from different vendors or instances from a same vendor, to customers.

Option for Improving Agent/Customer Interactions

The data output by the machine learning model during the method 400 may, additionally or alternatively, be used to decide on which demographics and which type of customers a particular agent works best with. This can be used to tailor agent training for improving agents' skills for specific customer groups.

For multiple branches/locations/shifts, the particular agents that are available can be balanced, in view of the output of the machine learning model, in order to be best equipped to handle different types of incoming customers. In one embodiment, a simulation of incoming customers may be used to help validate agents' assignments via the method 400.

Figure 5:
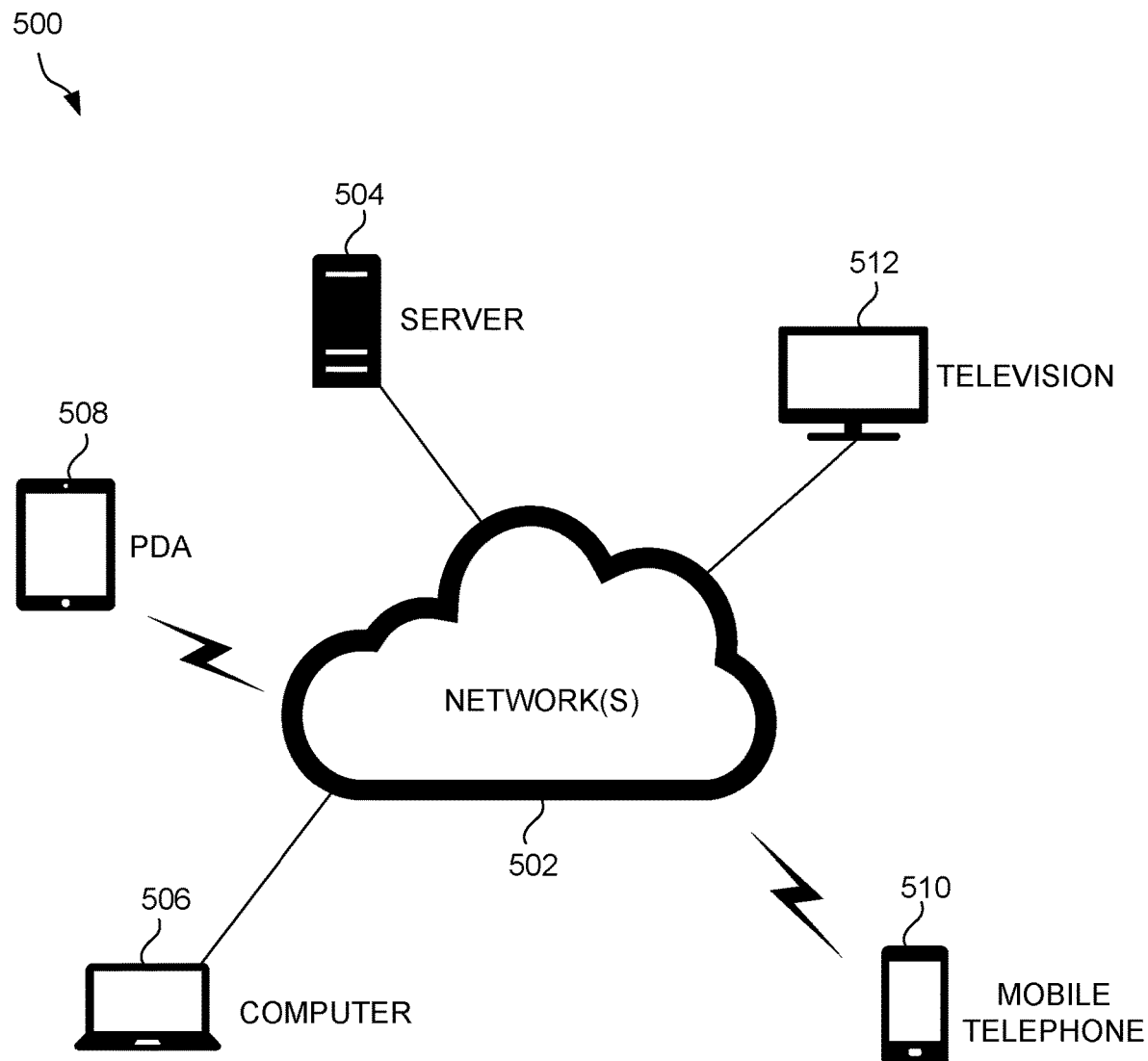
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
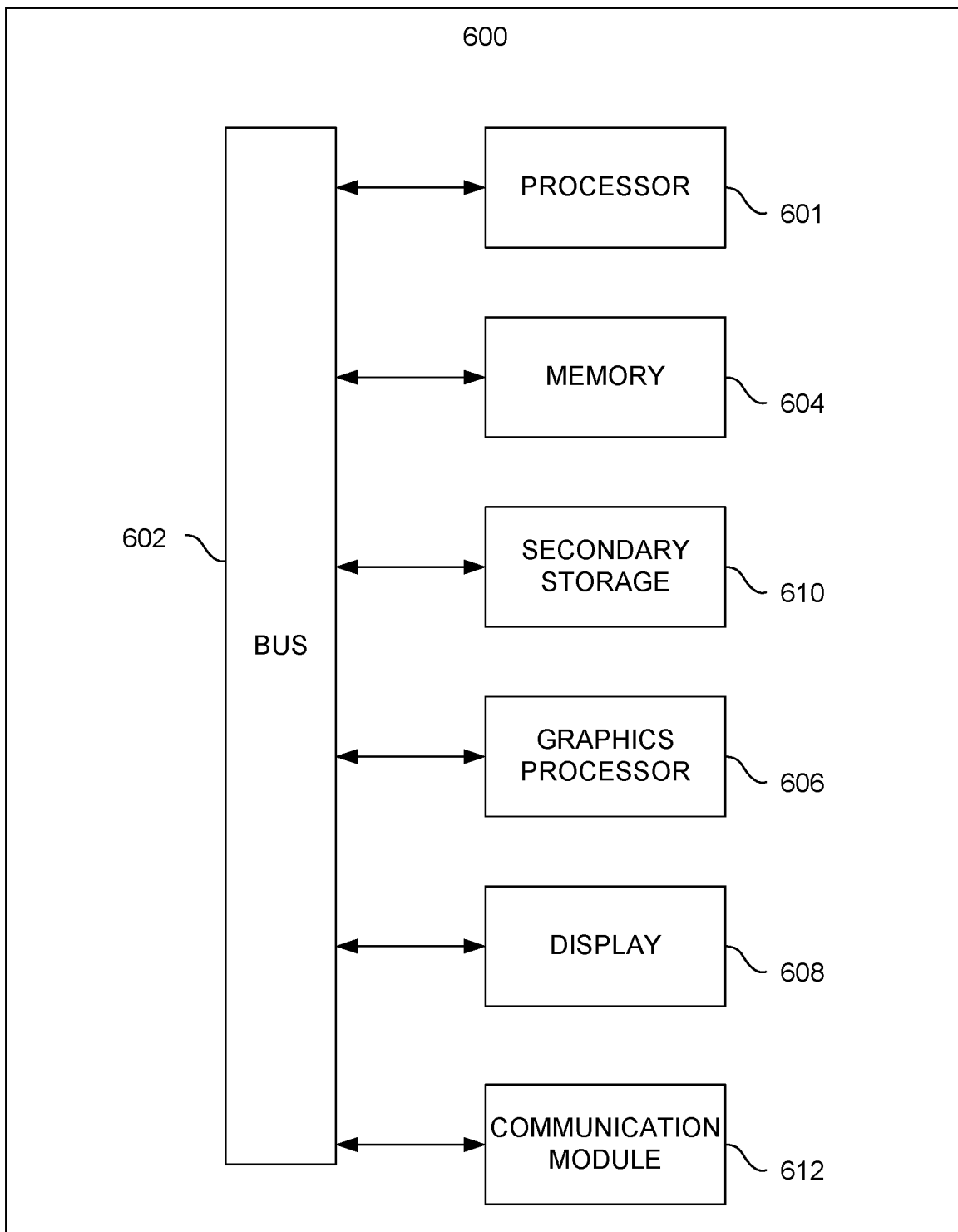
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   collecting training data that indicates outcomes of prior interactions between specified customers and specified agents of a physical retail store, wherein the outcomes are collected from logs of the prior interactions made by the specified agents;
   training a machine learning model, using the training data, to infer, for different combinations of a given customer with each of a plurality of given agents of the physical retail store, an outcome expected with respect to the given agent communicating with the given customer to provide retail assistance within the physical retail store, wherein the outcome that the machine learning model is trained to infer is a monetary value selected from:
      a positive value for customer purchases,
      a negative value for customer refunds, and
      zero for no customer action;
   identifying presence of a customer at retail store;
   determining a plurality of agents of the physical retail store available to assist the customer in the physical retail store;
   for each agent of the plurality of agents available to assist the customer in the physical retail store, processing information describing the customer and information describing the agent, using the machine learning model, to determine an expected outcome of an interaction of the agent with the customer occurring within the physical retail store including a monetary value that is one of:
      a positive value for a customer purchase,
      a negative value for a customer refund, and
      zero for the customer taking no action;
   selecting one agent of the plurality of agents for assisting the customer in the physical retail store, based on the expected outcome determined for each agent of the plurality of agents;
   notifying the agent to begin interacting with the customer;
   recording the interaction of the agent with the customer, based on input to a point of sale system of the physical retail store;
   after the interaction of the agent of the physical retail store with the customer, determining an actual outcome of the interaction from the recorded interaction;
   evaluating the agent by comparing the actual outcome with the expected outcome determined for the agent; and
   using a result of the evaluation for assigning the agent to future customers.

2. The non-transitory computer readable medium of claim 1, wherein the customer presence in the physical retail store is identified using a facial recognition algorithm.

3. The non-transitory computer readable medium of claim 1,
   wherein the machine learning model s further trained using at least one of:
      data in a customer relationship management system, or
      publicly available data.

4. The non-transitory computer readable medium of claim 1, wherein the information associated with the customer includes an identifier of the customer.

5. The non-transitory computer readable medium of claim 1, wherein the agent is evaluated over time for multiple customer interactions, and results of the evaluations are combined.

6. The non-transitory computer readable medium of claim 1, further comprising:
assigning the agent to interact with an additional customer having a presence in the physical retail store, based on the result of the evaluation.

7. The non-transitory computer readable medium of claim 1, wherein an output of the machine learning model further includes an expected time required for each agent of the plurality of agents to serve the customer.

8. A method, comprising:
collecting training data that indicates outcomes of prior interactions between specified customers and specified agents of a physical retail store, wherein the outcomes are collected from logs of the prior interactions made by the specified agents;
training a machine learning model, using the training data, to infer, for different combinations of a given customer with each of a plurality of given agents of the physical retail store, an outcome expected with respect to the given agent communicating with the given customer to provide retail assistance within the physical retail store, wherein the outcome that the machine learning model is trained to infer is a monetary value selected from:
a positive value for customer purchases,
a negative value for customer refunds, and
zero for no customer action;
identifying presence of a customer at retail store;
determining a plurality of agents of the physical retail store available to assist the customer in the physical retail store;
for each agent of the plurality of agents available to assist the customer in the physical retail store, processing information describing the customer and information describing the agent, using the machine learning model, to determine an expected outcome of an interaction of the agent with the customer occurring within the physical retail store including a monetary value that is one of:
a positive value for a customer purchase,
a negative value for a customer refund, and
zero for the customer taking no action;
selecting one agent of the plurality of agents for assisting the customer in the physical retail store, based on the expected outcome determined for each agent of the plurality of agents;
notifying the agent to begin interacting with the customer;
recording the interaction of the agent with the customer, based on input to a point of sale system of the physical retail store;
after the interaction of the agent of the physical retail store with the customer, determining an actual outcome of the interaction from the recorded interaction;
evaluating the agent by comparing the actual outcome with the expected outcome determined for the agent; and
using a result of the evaluation for assigning the agent to future customers.

9. A system, comprising:
a non-transitory memory storing instructions; and
one or more processors in communication with the non-transitory memory that execute the instructions to perform a method comprising:
collecting training data that indicates outcomes of prior interactions between specified customers and specified agents of a physical retail store, wherein the outcomes are collected from logs of the prior interactions made by the specified agents;
training a machine learning model, using the training data, to infer, for different combinations of a given customer with each of a plurality of given agents of the physical retail store, an outcome expected with respect to the given agent communicating with the given customer to provide retail assistance within the physical retail store, wherein the outcome that the machine learning model is trained to infer is a monetary value selected from:
a positive value for customer purchases,
a negative value for customer refunds, and
zero for no customer action;
identifying presence of a customer at retail store;
determining a plurality of agents of the physical retail store available to assist the customer in the physical retail store;
for each agent of the plurality of agents available to assist the customer in the physical retail store, processing information describing the customer and information describing the agent, using the machine learning model, to determine an expected outcome of an interaction of the agent with the customer occurring within the physical retail store including a monetary value that is one of:
a positive value for a customer purchase,
a negative value for a customer refund, and
zero for the customer taking no action;
selecting one agent of the plurality of agents for assisting the customer in the physical retail store, based on the expected outcome determined for each agent of the plurality of agents;
notifying the agent to begin interacting with the customer;
recording the interaction of the agent with the customer, based on input to a point of sale system of the physical retail store;
after the interaction of the agent of the physical retail store with the customer, determining an actual outcome of the interaction from the recorded interaction;
evaluating the agent by comparing the actual outcome with the expected outcome determined for the agent; and
using a result of the evaluation for assigning the agent to future customers.

* * * * *